Figure 1:
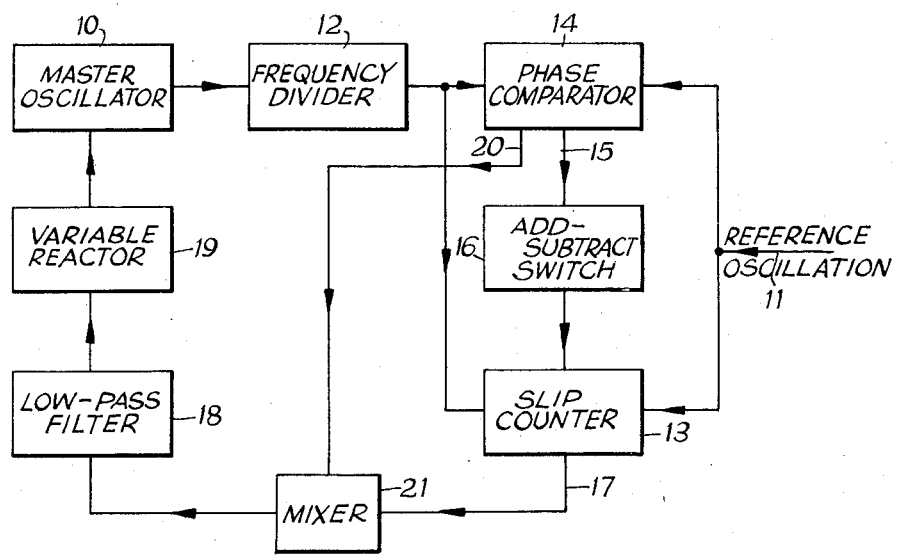

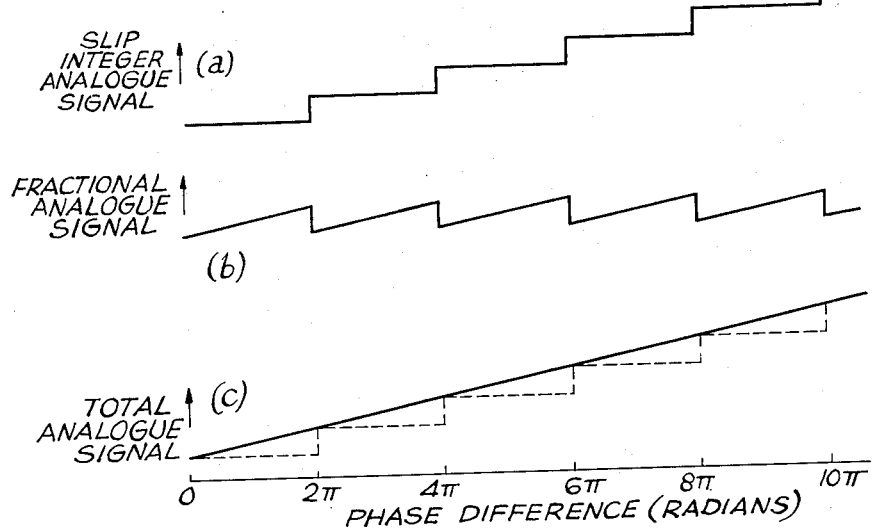
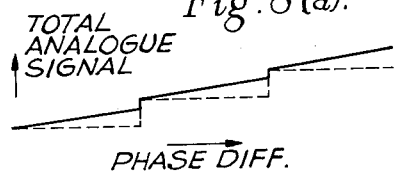
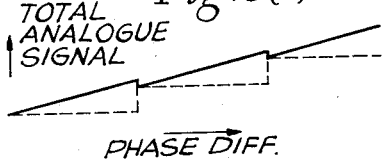
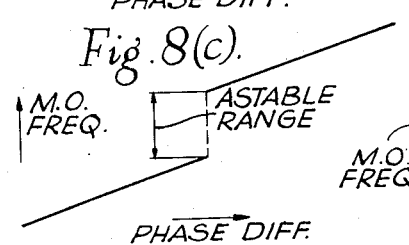
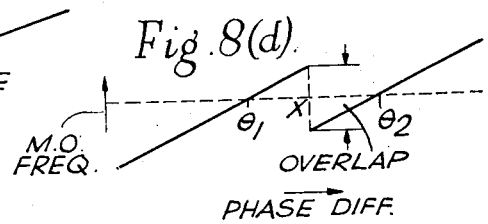

United States Patent Office 2,982,921
Patented May 2, 1961

2,982,921

AUTOMATIC FREQUENCY CONTROL CIRCUITS

Felix Rozner, Kenton, and Francis Oakes and John Victor James Corney, London, England, assignors to Ferguson Radio Corporation Limited, London, England, a British company Filed Feb. 25, 1959, Ser. No. 795,535

7 Claims. (Cl. 331—17)

The present invention relates to automatic frequency control circuits in which the frequency of an oscillation generator is maintained automatically in step with that of a reference oscillation.

It is well known to feed the oscillation from the generator and the reference oscillation to a phase comparator which generates a control voltage dependent upon the difference in phase of the two oscillations, this control voltage being applied to control the frequency of the generator. In a television waveform generator, for example, the said oscillation generator is usually a master oscillator generating an oscillation at some suitable multiple of the line frequency. The oscillation is applied to a divider chain which produces therefrom an oscillation of frame frequency, that is 50 c./s. in the British system, which is fed to a phase comparator for comparison with a reference oscillation from the supply mains.

It is often necessary to arrange that this automatic frequency control operates with a long time constant in order to prevent undesirably rapid changes in frequency of the master oscillator. The difficulty then arises that the circuit is unable to lock-in unless the frequency of the master oscillator is very close to the desired value.

In conventional automatic frequency control circuits the loop gain is a maximum when the controlled and reference frequencies are equal. The time constant of the control system is, therefore, a minimum under these conditions and increases as the difference between the controlled frequency and the reference frequency increases.

The present invention has for one of its objects to provide an automatic frequency control circuit which operates with a long time constant when the frequency difference is small, but which ensures locking-in despite a large frequency difference.

According to the present invention, there is provided an automatic frequency control circuit for maintaining the recurrence frequency of a first train of pulses derived from a generator automatically in step with the recurrence frequency of a train of reference pulses, comprising a phase comparator arranged to generate a sense-control voltage representative of the sense of the frequency difference between the two pulse trains, a counter arranged to generate a frequency control voltage dependent upon the difference between the numbers of pulses in the two trains and arranged to be controlled by the sense-control voltage in such a manner that the magnitude of the frequency control voltage is increased or decreased according as the frequency of one of the trains is greater or less than that of the other, and means for applying the frequency control voltage to control the said generator in such a manner as to tend to reduce the number of pulses counted.

The counter, referred to as a slip-counter, may be constituted by a chain of binary counters. The frequency control circuit preferably includes means arranged to generate a further frequency control voltage representative of the sense and magnitude of the frequency difference between the two trains, this further control voltage also being applied to control the frequency of the generator. Conveniently the same phase comparator is used to generate this further control voltage.

Figure 2:
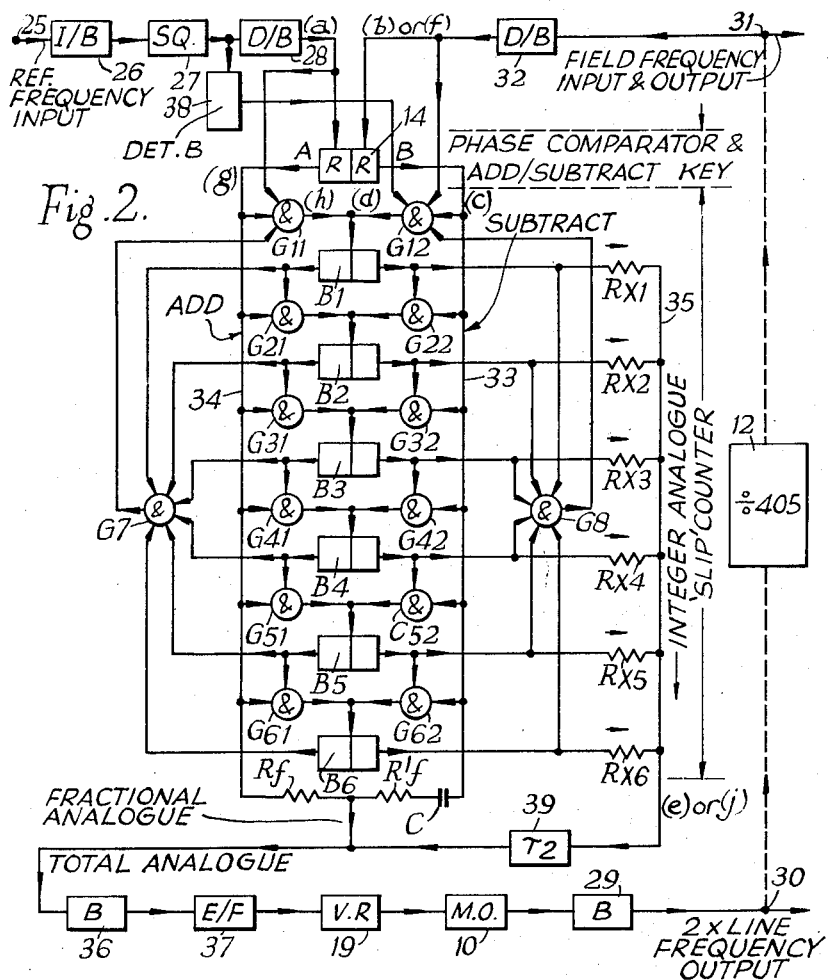
Figure 3:
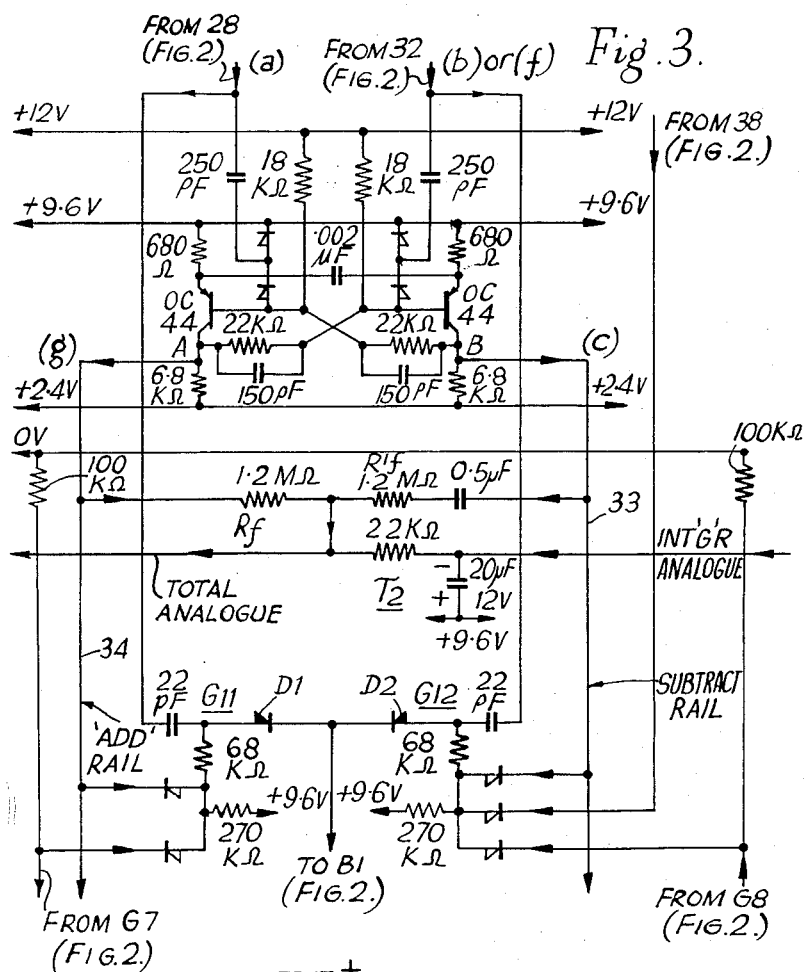
Figure 4:
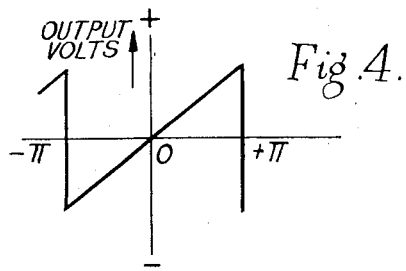
Figure 5:
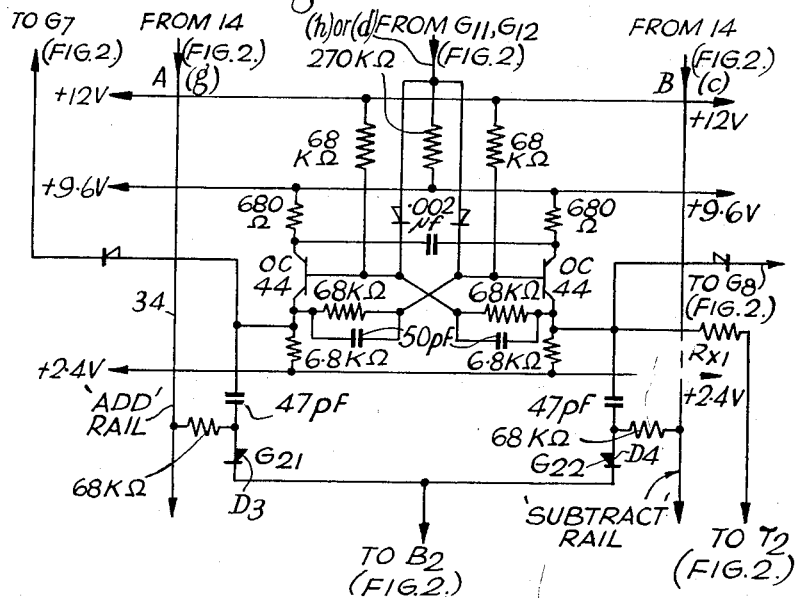
Figure 6:
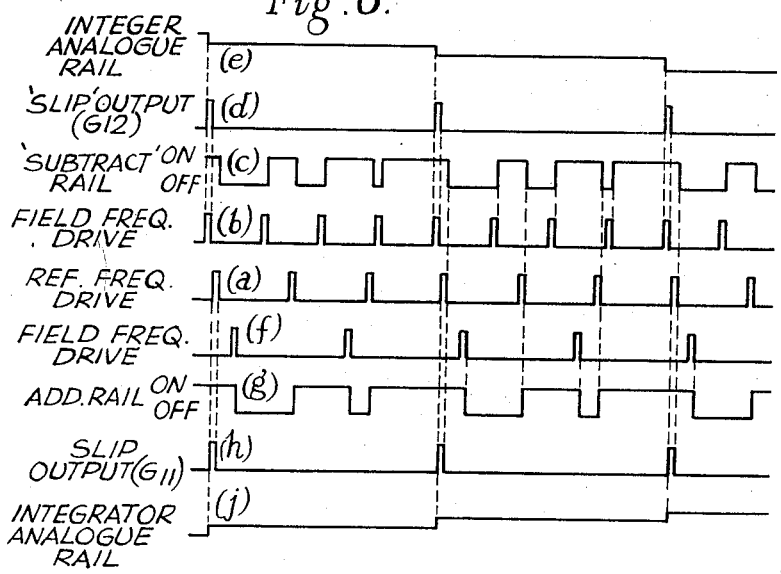

The invention will be described, by way of example, with reference to the accompanying drawings in which Fig. 1 is a simplified block circuit diagram of one embodiment of the invention using both a voltage derived from a slip counter and also a voltage derived from a phase comparator for frequency control, Fig. 2 is a more detailed block circuit diagram of the embodiment of Fig. 1, Fig. 3 is a circuit diagram of a preferred form of phase comparator for use in the circuits of Figs. 1 and 2, this being in accordance with the invention of British patent application No. 35,142/55 and being referred to herein as the Rozner phase comparator, together with associated gate circuits, Fig. 4 is a diagram illustrating the operation of the phase comparator of Fig. 3, Fig. 5 is a circuit diagram of the first counter stage in Fig. 2 together with associated gates, Fig. 6 shows waveforms present at certain points in Figs. 2, 3 and 5, and Figs. 7 and 8 are diagrams illustrating the operation of Fig. 2.

The meaning of lettering in various blocks in Fig. 2 is indicated beneath the figure. The waveforms present at various points in Figs. 2, 5 and 7 are indicated in those figures by the letters identifying those waveforms in Fig. 8.

Referring now to Fig. 1, it is assumed that the frequency of an oscillation generated by a master oscillator 10 is to be controlled in dependence upon a reference oscillation applied at 11. When the frequency concerned is too high for satisfactory control it is reduced to a lower value by a frequency divider 12. The oscillations from 12 and 11 are applied to a slip-counter 13 arranged to count the difference between the number of cycles of the two oscillations applied thereto. The oscillations from 12 and 11 are also applied to a phase comparator 14 arranged to generate at 15 a voltage dependent upon the sense of the difference in frequency and this voltage is applied to an add-subtract switch 16 coupled to the counter 13. The effect of this voltage is to cause the counter 13 to increase or decrease a control voltage generated at its output 17 in response to each count according to the sense of the frequency difference. The control voltage is applied through a low-pass filter 18 to a variable reactor 19 which serves to control the frequency of the master oscillator 10.

If desired a frequency control circuit of known type may be provided in addition to that described. Thus the phase comparator 14 generates at its output 20 a voltage whose magnitude and sense are representative of the magnitude and sense of the phase difference between the inputs from 12 and 11. This voltage is mixed in a mixer 21 with the control voltage from 17 and the combined control voltage is applied to the low-pass filter 18.

Referring now to Fig. 2, this shows a circuit suitable for generating television line and field frequency pulses locked to a reference source such as the mains supply. A sinusoidal reference oscillation is applied to a terminal 25 and thence in succession through an integrator-buffer 26, a squaring circuit or amplitude limiter 27 and a differentiator-buffer 28 at the output of which there is generated a train of reference pulses as shown at (a) in Fig. 6. In Fig. 6 the waveforms (b), (c), (d), and (e) represent the case where the field frequency is greater than the reference frequency and waveforms (f), (g), (h) and (j) represent the case where the field frequency is less than the reference frequency.

A master oscillator 10 generates oscillations at twice line frequency and its output is fed through a buffer stage 29 to a first output terminal 30. This terminal is connected through a divider 12 dividing by 405 to a second output terminal 31 providing the field frequency output. The field frequency is fed to a differentiator-buffer 32 which generates field frequency pulses as shown in Fig. 6(b) or (f).

The reference and field frequency pulses from 28 and 32 are fed to a Rozner phase comparator 14. One output at B of waveform (c) is applied to a "subtract" rail 33 and thence to a series of coincidence gates $G_{12}$, $G_{22}$, $G_{32}$ ... $G_{62}$. The other output of the phase comparator 14 at A of waveform (g) is applied to an "add" rail 34 and thence to a series of coincidence gates $G_{11}$ ... $G_{61}$. The gate $G_{12}$ is fed with field frequency pulses (b) or (f) from 32 and the gate $G_{11}$ is fed with reference frequency pulses (a) from 28. The output of gates $G_{11}$ and $G_{12}$ are applied to the first counter $B_1$ of a binary counter chain including six binary counters $B_1$ to $B_6$. These counters will be described later with reference to Fig. 5. Their outputs are connected through separate resistors $R_{x1}$ ... $R_{x6}$ to an integer analogue rail 35 on which appears a voltage dependent upon the number of "slip" pulses counted and upon the relative phase of the field and reference pulses.

The gating waveforms (g) and (c) on the "add" and "subtract" rails 34 and 33 open their associated gates when positive. Thus if the reference frequency is the greater, waveform (g) on the "add" rail 34 will activate the gate $G_{11}$ and allow the "slip" pulses (h) to pass to the counter $B_1$. The gates $G_{21}$ ... $G_{61}$ are simultaneously activated and an integer analogue output (j) appears on the rail 35. This is applied through a buffer stage 36 and an emitter-follower stage 37 to the variable reactor 19 which controls the frequency of the master oscillator 10. In this case the sense of the control is such as to increase the master oscillator frequency.

If the field frequency is greater than the reference frequency, the waveform (c) on the "subtract" rail 33 activates the gate $G_{12}$ to pass the "slip" pulses (d) and also renders the gates $G_{22}$ ... $G_{62}$ active. The integer analogue output on the rail 35 then has the form (e) and its effect is to tend to reduce the frequency of the master oscillator 10.

In order to prevent a failure of the reference frequency input from causing the field frequency to assume a value as near zero as the system will permit, the output of 27 is coupled through a detector buffer 38 to the gate $G_{12}$. The effect of this is that in the absence of an input from 38, the gate $G_{12}$ remains closed and prevents further field pulses from passing to the counter $B_1$. Hence the frequency of the master oscillator 10 changes only slightly from its value immediately before the failure of the reference oscillation.

Gates $G_7$ and $G_8$ provide "end stops" for the counter to prevent its being reset directly from end to end by a miscount or by a dynamic over-count when the reference frequency is near the limits of the operating range. When the damping of the system is adequate these gates are not of great importance.

The integer analogue voltage on the rail 35 can only assume a finite number of stable levels as indicated in Fig. 7(a) and hence the system as so far described is liable to "hunt" between the two frequencies corresponding to two of these levels which lie on either side of the reference frequency. Since the Rozner phase comparator, as shown in Fig. 4, has a total range of $2\pi$ radians and one step in the integer analogue corresponds to one "slip" cycle, the output of the comparator can be used to fill in the gaps in the range of the slip counter. This is done in Fig. 2 by the resistor $R_f$ which feeds into the output a voltage as shown in Fig. 7(b) which represents the mean collector potential in the phase comparator. The result of adding this "fractional analogue" voltage to the "integer analogue" voltage is shown in Fig. 7(c). This fractional analogue voltage corresponds to that fed by lead 20 to the mixer 21 in Fig. 1.

If the fractional analogue component is inadequate as shown in Fig. 8(a) there is an astable region as indicated in Fig. 8(c) over which the system will "hunt." In order to avoid this, the resistor $R_f$ is given a value just less than that required to provide a maximum current equal to the current obtained from the resistor $R_{x1}$ associated with the counter $B_1$. The effect is to produce a slight overlap as shown in Fig. 8(b) which results in a control as indicated in Fig. 8(d). Within the overlap range there are two stable phase relationships which can produce a given master oscillator frequency.

It is necessary to remove from the fractional analogue output the waveform (g) and this is achieved by a resistor $R_f'$ and a capacitor C. This circuit connected to the output B of the phase comparator 14, which is provided as an alternative to the low-pass filter 18 in Fig. 1, provides an A.C. component in anti-phase with that from the output A through the resistor $R_f$ which balances the latter without altering the steady-state mean D.C. component.

The time delay introduced by the "fractional analogue" circuit is compensated for by a time delay introduced into the integer analogue circuit by a time-delay network 39. This time delay should be no longer than is necessary to prevent "hunting." A value of about 0.2 second is suitable in the present example where $R_f'$ and C have a time constant of 0.5 second.

Referring to Fig. 3, this shows the circuit of the Rozner phase comparator 14 and of the gates $G_{11}$ and $G_{12}$ of Fig. 2. The diodes $D_1$ and $D_2$ of the gates are type OA79 and all the other diodes in Fig. 3 are type OA70.

It may be noted that the Rozner phase comparator is operated by the trailing edges of the field and reference pulses. A pulse of either kind sets the comparator to a state in which (a) a following pulse, if from the same source (field or reference), will be passed by either $G_{11}$ or $G_{12}$ and (b) the gates coupling the slip counter stages are set to produce an analogue change in the correct sense. The setting pulse itself is not passed into the counter. If the frequencies are the same, the following pulse is inevitably of unlike kind and resets the counter coupling gates for its own kind. Only when the frequencies differ can two active edges of the higher frequency pulse train appear between two active edges of the lower frequency pulse train (as shown in Fig. 6(a) and (b)) and this condition occurs once per "slip" cycle. The second pulse of like kind is then gated into the slip-counter and counted with appropriate sign.

Fig. 5 shows the circuit of the first binary slip-counter $B_1$ together with the gates $G_{21}$ and $G_{22}$ of Fig. 2. The diodes $D_3$ and $D_4$ are of type OA79 and all the other diodes are of type OA70.

The resistors $R_{x1}$ to $R_{x6}$ in Fig. 2 have the values 1500, 820, 400, 200, 100 and 50 kilo-ohms respectively.

The counter chain in the circuit of Fig. 2 will store a total count of $(2^6-1)$ cycles and the range of the analogue output is thus 64 cycles. This will swing the field frequency from 47 c./s. to 52 c./s. and the time constant of the control circuit is therefore 64/5 which is approximately equal to 12 seconds. Thus there is not only a wide range of "pull in" but also a desirably long time constant.

Although the invention has been described with particular reference to television signals it is not so limited but may be applied wherever it is required to maintain a generator of an oscillation or of pulses in step with a reference oscillation or pulse train.

We claim:

1. An automatic frequency control circuit for maintaining the recurrence frequency of generated train of pulses equal to the recurrence frequency of a train of reference pulses of constant frequency comprising, in combination, a phase comparator having first and second input terminals and first and second output terminals, means for applying said train of generated pulses and said train of reference pulses to said first and second input terminals, respectively, said phase comparator being operative to produce sense control voltages at said first or second output terminal in response to the frequency of said generated train of pulses being higher or lower, respectively, than the frequency of said reference train of pulses, pulse counter means having first and second input circuits each including means respectively responsive to the sense control voltage at said first and second input terminals, means coupling said train of generated pulses and said train of reference pulses to said first and second input circuits, respectively, said pulse counter means being operative to add or subtract pulses depending upon at which output terminal of said phase comparator a sense voltage is produced and to generate a frequency control voltage proportional to the number of pulses counted thereby, and means operative in response to said frequency control voltage for controlling the frequency of said generated train of pulses in a direction to reduce the number of pulses counted by said counter means.

2. An automatic frequency control circuit for maintaining the recurrence frequency of a first train of pulses equal to the recurrence frequency of a train of reference pulses comprising, in combination, a pulse generator having potential-responsive means for controlling its frequency for generating said first train of pulses, a reference source of pulses of constant frequency, a phase comparator having first and second input terminals and first and second output terminals, means coupling said first train of pulses and said reference pulses to said first and second input terminals, respectively, said phase comparator being operative to generate a control signal at said first or said second output terminal depending on the sense of the frequency difference between said first train of pulses and said train of reference pulses, a pulse counter circuit, means including at least first and second gating circuits respectively coupling said first train of pulses and said train of reference pulses to said counter circuit, means coupling said first and second control signals to said first and second gating circuits, respectively, means in circuit with said counter circuit operative to generate a frequency control voltage having a sense determined by which of said pulse trains has the higher frequency and a magnitude proportional to the difference between the number of pulses in said pulse trains, and means applying said frequency control voltage to said potential responsive means for controlling the frequency of said pulse generator in a direction to reduce the number of pulses counted by said counter circuit.

3. An automatic frequency control circuit for maintaining the recurrence frequency of a first train of pulses equal to the recurrence frequency of a train of reference pulses of constant frequency comprising, in combination, a phase comparator having first and second input terminals and first and second output terminals, means coupling said first train of pulses and said train of reference pulses to said first and second input terminals, respectively, said phase comparator being operative to generate a sense control voltage at one or the other of said output terminals depending on the sense of the frequency difference between said first train of pulses and said train of reference pulses, a pulse counter circuit, first and second input circuits coupled to said counter circuit each including a gating circuit respectively connected to the first and second output terminal of said phase comparator, means coupling said first train of pulses and said train of reference pulses to said first and second input circuits, respectively, means connected to said counter circuit operative to generate an analogue voltage having a sense dependent upon which of said pulse trains has the higher frequency and a magnitude dependent upon the difference between the number of pulses in said two pulse trains, and means operative in response to said analogue voltage for controlling the frequency of said first train of pulses in a direction to reduce the number of pulses counted by said counter circuit.

4. A circuit for automatically controlling the recurrence frequency of a pulse generator having potential-responsive means for controlling its frequency comprising, a reference source of pulses of constant recurrence frequency, a phase comparator having first and second input terminals and first and second output terminals, means for applying a pulse train from said generator to said first input terminal, means coupling said reference source of pulses to said second input terminal, said phase comparator being operative to generate gating pulse signals at said first or second output terminal in response to the frequency of the pulses from said generator being higher or lower, respectively, than the frequency of said reference pulses, a multi-stage binary counter each stage having first and second input circuits each including a gating circuit respectively connected to said first and second output terminals of said phase comparator and responsive to the gating pulse signals appearing thereat, means coupling the pulses from said generator and said reference pulses to the first and second input circuits, respectively, of the first stage of said counter, said counter being operative to add or subtract pulses depending upon at which output terminal of said phase comparator gating pulse signals are produced, a resistance network connected to the stages of said counter operative to generate an analogue frequency control voltage proportional to the number of pulses counted by said counter, and means applying said frequency control voltage to said potential-responsive means for controlling the frequency of said pulse generator in a direction to reduce the number of pulses counted by said counter.

5. A circuit according to claim 4 wherein said phase comparator has a working range of substantially $2\pi$ radians at the frequency of the pulses applied thereto.

6. A circuit according to claim 4 further including circuit means including at least a resistor connected between the output terminals of said phase comparator for producing a fractional analogue frequency control voltage, and means for combining said fractional analogue frequency control voltage with said analogue frequency control voltage.

7. A circuit according to claim 4 further including circuit means including a resistor and a filter connected between the output terminals of said phase comparator operative to remove the wave form of the gating pulse signals appearing thereat and to produce a fractional analogue frequency control voltage, and means for combining said fractional analogue control voltage with said analogue frequency control voltage.

References Cited in the file of this patent
UNITED STATES PATENTS

| | | |
|---|---|---|
| 2,490,404 | Bliss | Dec. 6, 1949 |
| 2,631,239 | Lower | Mar. 10, 1953 |
| 2,891,157 | Hansel | June 16, 1959 |